Feb. 3, 1953 P. D. BECKER 2,627,099
SELF-PIERCING FASTENER
Filed Oct. 8, 1949
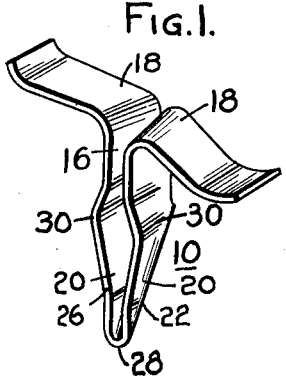
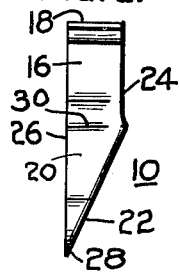
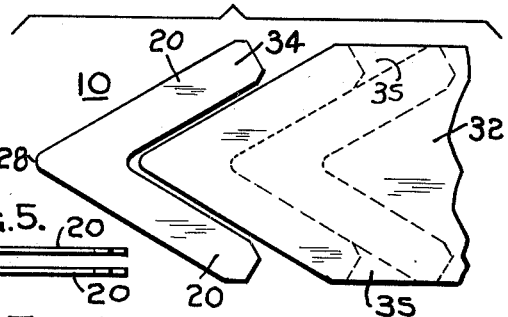
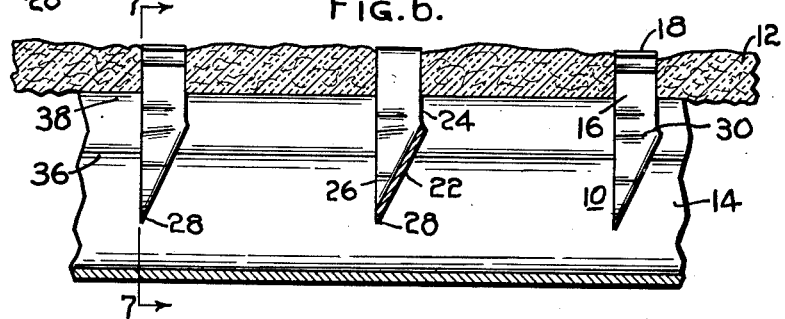
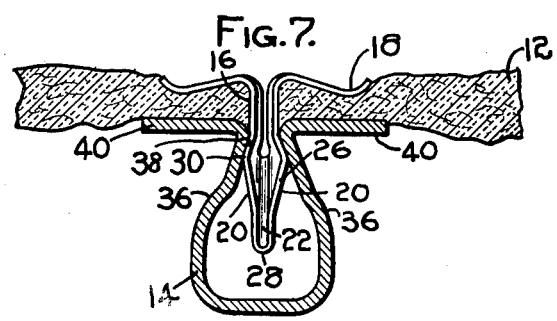
INVENTOR:
PHILIP D. BECKER,
BY Philip E. Parker
ATTORNEY.

Patented Feb. 3, 1953

2,627,099

UNITED STATES PATENT OFFICE 2,627,099

SELF-PIERCING FASTENER

Philip D. Becker, Hingham, Mass., assignor to United-Carr Fastener Corporation, Cambridge, Mass., a corporation of Massachusetts Application October 8, 1949, Serial No. 120,231

4 Claims. (Cl. 24—213)

This invention relates to fastening devices, and has particular reference to a fastening device formed of sheet metal which is particularly adapted for use in fastening sheets of relatively loose or flocculent material to a supporting member.

The object of the invention is to provide a fastening device having a head and a shank in which the shank is formed of a single piece of sheet metal folded to provide a pair of legs having a piercing point at the end thereof.

A further object of the invention is to provide a fastening device comprising a shank and a head disposed thereon, in which the fastener is shaped and arranged to be formed of a single piece of sheet metal from a continuous strip with a minimum amount of waste metal.

A still further object of the invention is to provide a fastening device which has a shank adapted to pierce a sheet of flocculent material and engage a supporting member and a head adapted to engage the outer surface of the flocculent material, in which the shank is formed of a single piece of sheet metal which is folded to provide a pair of legs joined at the lower end by a diagonal fold to provide a pointed end for piercing the flocculent material.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is a perspective view of a fastener member embodying the features of the invention;

Fig. 2 is a view in side elevation of the fastener member of Fig. 1;

Fig. 3 is a view of the fastener of Fig. 2 as seen from the left side;

Fig. 4 is a plan view of a strip of sheet metal illustrating the method of cutting a blank therefrom for forming the fastener;

Fig. 5 is a view of a blank after an initial forming operation;

Fig. 6 is a view in elevation, partly in section of a panel assembly illustrating the use of the fastener member in a particular application; and Fig. 7 is a view in section taken on line 7—7 of Fig. 6.

Referring to the drawing, there is illustrated a fastener member 10, which is adapted to pierce a sheet 12 of flocculent material such as glass wool, or the like and snap into engagement with a supporting member 14 to retain the sheet 12 in assembly with the supporting member.

The fastener 10 comprises generally a shank 16, which is adapted to extend through the sheet 12 and engage the member 14, and a head 18 which has a relatively large area to bear against the outer surface of the sheet 12. The shank 16 comprises a pair of legs 20 which are formed of a single piece of sheet metal as will be hereinafter described, and the legs 20 are joined at the end opposite the head by a diagonal fold 22 which extends from one edge 24 of the shank downwardly and across to the other edge 26 forming a pointed end 28 on the shank. The head 18 is provided by turning the upper ends of the legs outwardly to extend in opposite directions from the shank. To provide means for engaging the supporting member 14, a pair of shoulders 30 are disposed on the shank, which are formed by rounding opposing portions of the legs 20 outwardly away from each other. In the preferred form, the shoulders 30 extend from the end of the fold 22 at the edge 24 of the shank directly across to the other edge with the distance between the outwardly rounded portions increasing toward the edge 26 so that the thickest portion of the shank is on said edge approximately opposite the upper end of the fold 22.

The fastener is conveniently formed from a continuous strip 32 of sheet metal by cutting a blank 34 in which the legs 20 are joined in such a manner as to give the blank the shape of a V. The shape of the blanks 34 enables them to be cut from the strip 32 with a minimum amount of waste metal as illustrated in Fig. 4, in which only the portions 35 of the strip will be wasted. To form the fastener from the blank 34 the blank is folded at the junction of the legs 20 so that the legs are superimposed with their flat sides opposing as illustrated in Fig. 5, which produces the diagonal fold 22 and the pointed end 28 after which the head 18 and the shoulders 30 may then be formed in any convenient manner. When the fastener is formed from the continuous strip 32 on an automatic machine, the sequence of the forming operations may be varied to suit the requirements of the machine, and it may be convenient to form the head and the shoulder portions before the legs are subjected to the folding operation hereinbefore described.

Referring to Fig. 6, there is shown a panel assembly illustrating the use of the fastener in a particular application. In this assembly the supporting member 14 is in the shape of a channel comprising a pair of outwardly rounded walls 36 which converge at the upper portion to form a longitudinal slot 38 to receive the shank 16 of the fastener, and then diverge to form a pair of flanges 40 to bear against the inner surface of the sheet 12. To retain the sheet assembled on the support member, the pointed end 28 of the fastener is forced through the sheet and into the slot 38, so that the shoulders 30 snap behind the converging portions of the walls and draw the fastener into the slot, thereby pulling the head 18 against the outer surface of the sheet 12. The dimensions of the fastener are preferably such that when the shank is snapped into engagement with the support, the portion of the sheet 12 engaged by the head is drawn downwardly and compressed to insure that the sheet is securely retained against the support.

Although in the assembly of Figs. 6 and 7 the fasteners are snapped into a longitudinal slot, it will be apparent that individual openings may be provided to receive the fasteners with equally good results. By reason of the pointed end formed by the fold, the fastener is particularly adapted for piercing flocculent material, but its use is not limited thereto, since it may also be used to assemble sheets of cloth, rubber or other material not readily pierceable by the fastener, provided that suitable openings are formed in the material to allow the shank to pass therethrough for engagement with a support member.

Since certain other obvious modifications may be made in the device without departing from the scope of the invention, it is intended that all matter contained herein be interpreted in an illustrative, and not in a limiting sense.

I claim:

1. A fastener member, comprising a shank and a head disposed on the shank, said shank comprising a pair of legs having opposing sides, said legs being joined at the end opposite the head by a diagonal fold extending from shorter edges of the legs on one side of the shank downwardly to longer edges on the other side to form a sharp point on the end of the shank which is adapted to pierce a sheet of flocculent material, at least one of said legs having a shoulder element disposed only on the longer edge thereof and substantially opposite the end of the fold joining the shorter edges, whereby during insertion of the shoulder into a support opening, a major amount of the flexing of said legs occurs about said folded portion.

2. A fastener member, comprising a shank and a head disposed on the shank, said shank comprising a pair of spaced legs having opposing sides, said legs being joined at the end opposite the head by a diagonal fold extending from shorter edges of the legs on one side of the shank downwardly to longer edges on the other side to form a pointed end on the shank, said legs having opposing shoulder portions disposed only on said longer edges, and positioned substantially opposite the end of the fold joining the shorter edges, whereby during insertion of the shoulder into a support opening, said legs flex about said folded portion.

3. A self-piercing fastener for attaching flocculent material to a supporting member, said fastener being formed of a single piece of sheet metal and comprising a pair of substantially parallel spaced legs having opposing sides, said legs being joined at one end by a diagonal fold extending from shorter edges of the legs on one side downwardly to longer edges on the other side to form a pointed end which is adapted to pierce the flocculent material, the other ends of the legs being turned outwardly away from each other to form a head to engage the surface of the flocculent material when the fastener is assembled, said legs having outwardly rounded portions disposed opposite each other in only said other side of the legs, said outwardly rounded portions being disposed on said other side substantially opposite the end of the fold on said one side to form a pair of snap shoulders so positioned that during engagement of the shoulders in a support opening, said legs flex about said folded portion.

4. A self-piercing fastener for attaching flocculent material to a supporting member, said fastener being formed of a single piece of sheet metal and comprising a pair of substantially parallel spaced legs having opposing sides, said legs being joined at one end by a diagonal fold extending from shorter edges of the legs on one side downwardly to longer edges on the other side to form a pointed end which is adapted to pierce the flocculent material, the other ends of the legs being turned outwardly away from each other to form a head to engage the surface of the flocculent material when the fastener is assembled, said legs having opposing snap shoulders formed therein, said shoulders comprising an outwardly embossed portion extending generally transversely of the legs, said shoulders beginning initially in spaced relation to said shorter edges of the legs and increasing in height toward said longer edges of said legs, and being disposed substantially opposite the end of the fold joining said shorter legs, whereby during insertion of said fastener into a support opening, flexing of the legs to allow the shoulders to pass therethrough occurs principally about said folded portion.

PHILIP D. BECKER.

REFERENCES CITED

The following references are of record in the file of this patent:

UNITED STATES PATENTS

| Number | Name | Date |
|---|---|---|
| 1,538,314 | Dooner | May 19, 1925 |
| 2,077,120 | Lombard | Apr. 13, 1937 |
| 2,198,186 | Tinnerman | Apr. 23, 1940 |
| 2,534,663 | Gisondi | Dec. 19, 1950 |